United States Patent
Van Tonder et al.

(10) Patent No.: US 9,450,700 B1
(45) Date of Patent: Sep. 20, 2016

(54) EFFICIENT NETWORK FLEET MONITORING

(71) Applicant: Amazon Technologies, Inc., Reno, NV (US)

(72) Inventors: Martin Stephen Van Tonder, Western Cape (ZA); Varun Madan, Western Cape (ZA); Caleb Alexander Lyness, Western Cape (ZA)

(73) Assignee: Amazon Technologies, Inc., Reno, NV (US)

( * ) Notice: Subject to any disclaimer, the term of this patent is extended or adjusted under 35 U.S.C. 154(b) by 206 days.

(21) Appl. No.: 13/959,137

(22) Filed: Aug. 5, 2013

(51) Int. Cl.
 G06F 11/30 (2006.01)
 H04L 1/00 (2006.01)
 H04L 12/26 (2006.01)

(52) U.S. Cl.
 CPC ............. *H04L 1/0001* (2013.01); *H04L 43/04* (2013.01)

(58) Field of Classification Search
 USPC .......................................................... 714/37
 See application file for complete search history.

(56) References Cited

U.S. PATENT DOCUMENTS

| | | | |
|---|---|---|---|
| 7,451,208 B1 * | 11/2008 | Bakke et al. ................. | 709/224 |
| 7,937,616 B2 | 5/2011 | Armstrong et al. | |
| 8,006,124 B2 | 8/2011 | Park et al. | |
| 8,108,733 B2 | 1/2012 | Richmond | |
| 8,380,845 B2 | 2/2013 | Mercuri | |
| 2006/0179059 A1 | 8/2006 | Reed et al. | |
| 2007/0011495 A1 * | 1/2007 | Armstrong et al. ............ | 714/39 |
| 2007/0041327 A1 * | 2/2007 | Foster et al. .................. | 370/242 |
| 2007/0226299 A1 * | 9/2007 | Shaffer et al. ................ | 709/206 |
| 2009/0113034 A1 * | 4/2009 | Krishnappa et al. ......... | 709/223 |
| 2009/0287720 A1 | 11/2009 | Herter et al. | |
| 2009/0327519 A1 * | 12/2009 | Thiel et al. ................... | 709/239 |
| 2011/0167469 A1 | 7/2011 | Letca et al. | |
| 2011/0283149 A1 * | 11/2011 | Richmond ..................... | 714/39 |
| 2012/0297059 A1 | 11/2012 | Bross | |
| 2013/0007268 A1 | 1/2013 | Breiter et al. | |
| 2013/0054780 A1 | 2/2013 | Bade et al. | |
| 2013/0185408 A1 * | 7/2013 | Ngo .............................. | 709/223 |
| 2013/0283092 A1 * | 10/2013 | Das et al. ....................... | 714/3 |

OTHER PUBLICATIONS

U.S. Appl. No. 13/528,271, filed Oct. 22, 2012, Long X. Nguyen.
U.S. Appl. No. 13/942,630, filed Jul. 25, 2013, Long X. Nguyen, Andries Dippenaar.

* cited by examiner

*Primary Examiner* — Kamini Patel
(74) *Attorney, Agent, or Firm* — Robert C. Kowert; Meyertons, Hood, Kivlin, Kowert & Goetzel, P.C.

(57) ABSTRACT

Methods and apparatus for efficient monitoring of network fleets are described. A list of network addresses of a set of hosts at which resources are to be monitored from a monitoring server of a provider network may be received at the monitoring server. The monitoring server may initiate establishment of a persistent network connection to a monitoring agent installed at a monitored host. A plurality of health messages from the monitoring agent may be obtained via the connection, including a host status entry for the monitored host and a resource status entry for at least one resource configured at the monitored host. A representation of the health messages may be saved in a repository for analysis.

23 Claims, 9 Drawing Sheets

EFFICIENT NETWORK FLEET MONITORING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As the functionality and features supported by providers of virtualized compute, storage and networking resources grows, and as the fleet of hardware platforms that are used by large-scale providers grows, the task of implementing administrative control operations such as monitoring the status of the platforms (and/or the status of virtualized resources and applications executing on the platforms) has become more complicated. In addition, the speed with which services and systems can be brought back online after outages, especially large-scale outages, has become a critical issue influencing provider reputation and customer satisfaction.

Figure 1:
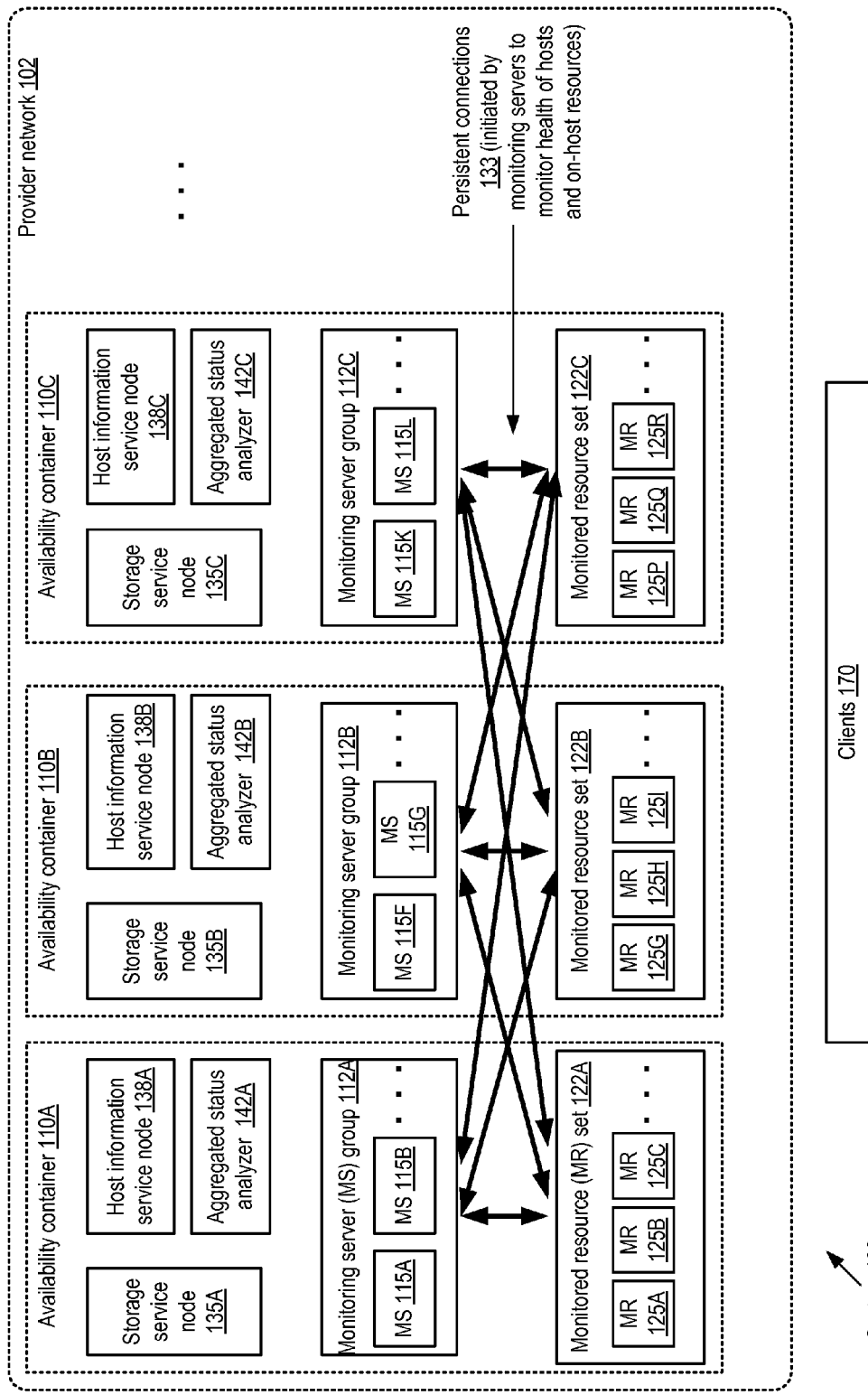
FIG. 1 illustrates an example of a system in which a fleet of monitoring servers of a provider network is configured to obtain health status from monitored resources using long-term connections whose establishment is initiated from the monitoring servers, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing efficient network fleet monitoring are described. Networks set up by an entity such as a company or a public sector organization to provide one or more network-accessible services (such as various types of cloud-based computing, storage or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

As the number of resources managed by the provider network increases, the probability of errors or failures occurring during any given time interval increases correspondingly, and as a result the complexity and cost of ensuring that resources remain available may increase as well. In some embodiments, one or more sets of dedicated monitoring servers may be designated to track the states of some or all of the remaining resources of a provider network, e.g., as part of an effort to maintain high overall levels of resource availability and rapid responsiveness to failures. Lightweight (i.e., low-overhead) monitoring agents may be installed at the resources to be monitored. Persistent or long-lived connections may be established from each of the monitoring servers to some set of monitoring agents—that is, the monitoring servers (instead of the monitoring agents or the monitored resources) may be responsible for initiating the process of connection establishment. The connections may remain in place for long terms (e.g., weeks or months) in at least some embodiments, e.g., until some maintenance operation or failure occurs. Any appropriate network protocol (or combination of protocols) may be used for the connections in various implementations, such as TCP/IP (Transmission Control Protocol/Internet Protocol), UDP (User Datagram Protocol) and the like. In some embodiments, the data transmitted may be encrypted using additional cryptographic protocols, e.g., SSL (Secure Sockets Layer) or TLS (Transport Layer Security). In at least one implementation, network protocol parameter settings and/or network device settings at one or both endpoints of the connections may be tuned to better support connection longevity.

Instead of relying upon traditional network address discovery mechanisms (such as the Domain Name Service (DNS) or other similar services) to determine the addresses of the monitored resources to which the persistent connections are to be established, in at least some embodiments a monitoring server may be the recipient of a list of network addresses of the monitored resources. For example, an administrative service of the provider network, such as a "host information service" responsible for keeping up with mappings between network addresses and various resources, may provide the list of network addresses. In at least one embodiment, such an administrative service may be configured to periodically (and/or based on detected events or conditions) provide an updated list of network addresses of monitored resources to the monitoring servers. In one embodiment, of such a list is not received at a monitoring server within a configurable time period, an alarm may be raised, or a corrective action may be taken such as a request for an updated list being sent to the administrative service.

Once a persistent, monitoring-server-initiated connection to a given monitored resource is established, the flow of health state information may begin. For example, in an embodiment in which the resources being monitored include virtualization hosts at which virtualized compute servers are instantiated, health state information messages regarding the virtualization host, as well as the virtualized compute servers (or other resources associated with the virtualization hosts) may be transmitted back to the monitoring server. A number of different health states may be defined for a given type of resource in some embodiments—for example, a virtualized compute resource may be deemed to be in a "normal" or "responsive" state if it responds within a threshold time to a configuration request submitted via a network, in an "overloaded" state if it responds with a larger-than-expected delay, or in a "disconnected" state if it does not respond to network request. Different sets of health states, with corresponding state transition rules indicating when a given state is entered from another state, may be defined for each type of monitored resource.

In some embodiments, the monitoring servers may be configured to store received health state information, e.g., in the form of health state snapshots corresponding to health messages received during respective time periods, in a persistent storage repository. In at least one embodiment, the repository used may comprise one or more nodes of a network-accessible storage service implemented at the provider network. Thus, in such embodiments, health state about resources being used by one service of the provider network (such as a virtualized compute service) may be stored using resources of another service (the storage service). Various kinds of analysis of collected health state information may be performed, e.g., covering different time intervals and different state information granularities, either at the monitoring servers or by downstream servers that are provided with access to the repository. If an unexpected health state is detected based on the collected information, e.g., if a virtualization host appears to be unresponsive or overloaded, one or more corrective actions may be initiated in some embodiments. For example, a decision to restart or reboot the host may be taken, or a decision to direct workload away from the host may be taken. The corrective actions may be determined and/or initiated at the monitoring servers, and/or at analysis servers to which the collected health state information is provided by the monitoring servers.

The number of monitoring servers to be configured to collect health state information may be determined based on a number of factors in various embodiments. For example, in some embodiments, various performance-related capabilities of the types of servers to be configured as monitoring servers may be considered. Connection establishment rate capabilities (e.g., how quickly a given type of server can establish outbound connections to large numbers of monitoring agents), health message analysis rate capabilities (e.g., how many health state messages can be analyzed per unit time), storage bandwidth capabilities (e.g., how many snapshots of health messages can be written per unit time from the server to a storage service node) and the like may be taken into account in such embodiments. In addition to or instead of the performance capabilities, availability requirements for the monitoring service itself may play a role in determining the size of the monitoring server fleet—for example, in one implementation, each monitored resource may be connected to at least K distinct monitoring servers under normal operating conditions. The total number of network-accessible resources of the provider network for which health information is to be collected, or the hierarchical arrangement of such resources, may also influence the number of monitoring servers to be deployed. For example, if the provider network includes N data centers, in one embodiment at least 3N monitoring servers may be set up, so that each data center has at least three monitoring servers. In at least some embodiments, health state messages may be transmitted across datacenter boundaries or even geographical region boundaries—e.g., resources at a given datacenter DC1 may be monitored by servers at a different datacenter DC2.

A number of different mechanisms may be used in various embodiments to ensure that health states are monitored efficiently, without consuming excessive resources. For example, in one embodiment, notification-enabled caches may be used by the monitoring servers to store health state records locally (e.g., in addition to storing aggregated health state information in a repository). A cache (e.g., in volatile memory) comprising respective cache entries indicative of health messages received from a plurality of monitoring agents at a plurality of monitored hosts may be instantiated. The cache may have an associated listener mechanism or interface, such that a notification is generated by the listener if it is determined that a particular entry has not been updated (i.e., that a health message from a particular monitored host or resource has not been received) for a configurable time period. Such a notification may be interpreted, e.g., by the monitoring server, as an indication that the corresponding resource may be in an unexpected or undesired state, and corrective actions may be initiated. A notification-enabled cache mechanism may require significantly fewer computing resources at the monitoring server to determine unexpected states than alternatives such as polling-based schemes. The monitoring agents may be implemented as lightweight threads or processes that run within a management software stack at the monitored resources in some embodiments. For example, in embodiments in which the monitored resources include virtualization hosts, a monitoring agent process or thread may run within a virtualization manager, or in a management virtual machine not accessible from guest virtual machines run on behalf of clients. In at least one implementation, health state records may be written to respective files in specified directories by the monitored resources, and the files may be read by the monitoring agent before the health state information is transmitted to the monitoring servers. In some embodiments, a monitoring server may use respective data structures to store entries for monitored resources in different health states—e.g., a hash table or hash map may be used for each state defined for a given type of resource, and a record for a given resource may be moved from one data structure to another as the resource state changes. Using this approach, the task of finding out exactly how many (and which specific) resources are in each state may be simplified.

In at least one embodiment, multiple monitoring servers may be configured to obtain health state information from a given monitored resource. Such an approach may improve the reliability and availability of the monitoring service itself—for example, if three monitoring servers establish persistent connections to a given monitoring agent at a virtualization host, and one or two of the monitoring servers fail, health state of the virtualization host may still be processed successfully at the remaining monitoring server. In some embodiments employing multiple monitoring servers, a quorum-based policy may be used to make health state decisions—e.g., if any one of the three monitoring servers is able to receive a health message during a given time interval indicating that a particular virtualization host is in a healthy, responsive state, the monitored host may be deemed to be healthy.

In at least some embodiments, the monitoring servers may be designed with a goal of rapid recovery in the event of large-scale failures, such as when a data center loses power, or when a large subset of the provider network's resources suffer from a simultaneous network outage. In some such embodiments, each monitoring server may be responsible for implementing a carefully designed schedule of connection re-establishment with a designated set of monitored resources. An overload avoidance criterion may be used to generate the schedule, so that, for example, instead of repeatedly re-trying to establish a connection with a given monitored resource, a configurable delay (which may be termed a back-off delay) is introduced between successive connection attempts. The schedule may indicate a sequence in which persistent connections are to be initiated to the monitored resources from a given monitoring server. In some implementations the schedules to be used by different monitoring servers may be coordinated in such a way that the a large number of monitored resources are contacted within a targeted time interval after a failure event is detected. For example, the set of monitored resources {MR} may be partitioned intelligently into subsets {MR-sub1}, {MR-sub2}, {MR-subN}, with each of N monitoring servers being responsible for establishing connections with the resources of a respective subset first, using respective lists of network addresses provided by the administrative service of the provider network. Using such a systematic approach to recovering monitoring capabilities, especially one in which queries to obtain the destination addresses for network connections are not required, and in which the monitored resources are not required to try to establish connections from their end, may be especially effective in reducing the time taken to resume normal operations after large-scale failure events.

Clients that utilize various services whose resources are monitored may be enabled to view or query health state information for resources of interest, according to some embodiments. For example, in one embodiment, one or more programmatic interfaces, such as web pages, application programming interfaces (APIs), command-line tools, or graphical user interfaces may be implemented to support client queries regarding resource health states. In response to a request received via such an interface, a representation of the health information available for a specified resource may be provided to the client, e.g., by the appropriate monitoring server and/or by a downstream analysis server configured to receive aggregated health status from one or more monitoring servers.

Example System Environments

FIG. 1 illustrates an example of a system 100 in which a fleet of monitoring servers of a provider network is configured to obtain health status from monitored resources using long-term connections whose establishment is initiated from the monitoring servers, according to at least some embodiments. As shown, system 100 includes a provider network 102 whose resources are arranged in a plurality of availability containers 110, such as availability containers 110A, 110B and 110C. A given availability container 110 may comprise a portion or all of one or more data centers in the depicted embodiment, and may be engineered in such a way as to prevent various types of failures within a given availability container from impacting operations at other availability containers. Thus, for example, availability container 110A may comprise a set of hardware, software and infrastructure components (such as power supplies, power distribution units, cooling/heating equipment, networking equipment and the like) that has a failure profile (e.g., a probability distribution over time of various types of faults or errors) that is not expected to be correlated with the failure profile of a different availability container 110B or 110C. Each availability container may itself be designed to have very low failure rates, along with the isolation characteristics that prevent cascading faults across multiple availability containers. The implementation of numerous availability containers 110 capable of containing failures within their boundaries may thus help support highly reliable and durable services—e.g., in one implementation, N replicas of the same database table partition may be stored at each of N different availability containers so that the partition remains accessible even if N−1 availability containers happen to become unavailable at once, reducing the probability of a complete outage to very near zero. Availability containers may also be referred to as "availability zones" in some implementations. In at least some embodiments, the resources of a geographically distributed provider network may be organized into a hierarchy of geographical regions, with each region comprising some number of availability containers, and each availability container comprising part or all of one or more data centers.

In the depicted embodiment, each availability container 110 has a respective monitoring server (MS) group 112, e.g., MS group 112A in availability container 110A, MS group 112B in availability container 110B, and MS group 112C in availability group 110C. The MS groups 112 may collectively be referred to as an MS fleet. Each MS group 112 may include one or more monitoring servers 115—e.g., MS group 112A includes MS 115A and 115B, MS group 112B includes MS 115F and 115G, MS group 112C includes MS 115K and 115L. Each monitoring server 115 may be configured to initiate the establishment of at least one persistent connection 133 (e.g., a connection expected to last for weeks, months or until a maintenance operation or a failure results in a disconnection) with each of one or more monitored resources 125 for which the monitoring server is responsible. Some of the resources 125 monitored by a given monitoring server 115 may be located in the same availability container 110 as the monitoring server in the depicted embodiment, while other monitored resources may reside in a different availability container 110—thus, the persistent connections 133 may cross availability container boundaries and/or data center boundaries.

Each availability container 110 may comprise a respective set 122 of monitored resources, such as MR set 122A with MRs 125A, 125B and 125C in availability container 110A, MR set 122B with MRs 125G, 125H and 125I in availability container 110B, and MR set 122C with MRs 125P, 125Q and 125R in availability container 110C. Several different types of resources may be included in a given MR set 122 in some embodiments, such as virtualization hosts on which virtual compute servers are instantiated, the virtual compute servers themselves, storage resources, networking resources and the like. In at least some embodiments, respective monitoring agents such as lightweight, low-overhead threads or processes may be instantiated at some or all of the MRs 125. A given monitoring agent may be responsible for responding to connection establishment requests from one or more monitoring servers, collecting state information locally at the MRs and transmitting it to the monitoring server(s) over the connections. Different approaches may be taken regarding the completeness or extent of state information that is transferred to the monitoring servers in various embodiments. Consider an example scenario in which the health state of a particular monitored entity E can be expressed completely (in accordance with some agreed-upon definition of completeness) using N health indicators, e.g., as a vector with N elements. In some embodiments, each time that a given monitoring agent transmits a health message regarding E to a monitoring server, all N health indicators may be included. In other embodiments, a differential or delta-based approach may be taken to transmitting health information, in which only those health indicators that have changes since the last transmission may be included—e.g., a particular health message may include N1 health indicators, but the next health message may include a different number N2 of health indicators, representing only the health-related changes at E since the previous health message was sent. Using such a delta-based or differential approach may have the benefit of reducing the total amount of health information transmitted (since in many cases at most a few health metrics may change between one message and the next). Using a complete set of N indicators in every message may have its own advantages—e.g., the inclusion of all the indicators may serve as an affirmative confirmation of the status of all the factors assumed to contribute to the health of the entity E.

As part of its suite of network-accessible services, the provider network may implement one or more storage services, such as a key-value data store, in some embodiments. At least some monitoring servers 115 may store aggregated representations of the health state information received from the monitored resources 125 at one or more storage service nodes 135, such as storage service nodes 135A, 135B or 135C. In one implementation, for example, a snapshot of the health state of a given set of MRs 125, as of a given point in time T, may be generated at an MS 115 based on health messages received during a time interval leading up to T, and stored as a storage service node 135. Such snapshots may be consumed or processed by aggregated status analyzers 142, such as aggregated status analyzers 142A, 142B or 142C. In a manner similar to the comprehensive versus differential approaches that may be taken to construct health messages as described above, the aggregated representations may also be stored using comprehensive approaches or differential approaches in various embodiments. In a comprehensive approach, for example, a full list of health indicators may be stored, while in the differential approach, only changes that have occurred since the last aggregated representation was generated may be included. Instead of batching information over a time period and then saving the collected information to a storage service node 135, in some embodiments the health information may be streamed directly to a storage service node or a different storage destination as soon as it is received at the monitoring servers. In at least some embodiments, analysis of collected health state information may be performed initially at the monitoring servers 115, and if necessary (e.g., if an unexpected or anomalous state is encountered), additional analysis may be performed by the aggregated status analyzers 142. In one embodiment, health status information may be collected from a plurality of MSs 155 at an given aggregated status analyzer 142, and if a discrepancy is found between the health state for a given MR 125 as reported by different MSs, a quorum-based determination of health state may be made at an aggregated status analyzer 142, as described below with reference to FIG. 2. In some embodiments the aggregated status analyzers 142 may also or instead be configured to perform trend analysis using data collected over days, weeks or months, e.g., to identify longer term failure trends and/or to find ways to improve overall provider network reliability. In some embodiments, aggregated status analyzers may not be used. In at least some implementations, in addition to or instead of using storage service nodes as repositories of health state information, in-memory (or persistent storage) caches at the MSs 115 may be used to store health state entries at least temporarily, as described below in further detail.

According to at least some embodiments, an administrative service of the provider network 102, such as a host information service, may be responsible for maintaining an up-to-date database of the network addresses of at least a subset of the monitored resources 125. Thus, in scenarios in which the monitored resources 125 include virtualization hosts at which instances of virtual compute servers are launched on behalf of clients 170, the administrative service may track the network addresses (e.g., private and/or public Internet Protocol addresses) assigned to the virtualization hosts and/or to the virtual compute server instances. In the depicted embodiment, nodes 138 of such a host information service may provide lists of the network addresses of MRs 125 to the MSs 115. For example, host information service node 138A in availability container 110A may provide a list of MR network addresses periodically, or on request, to MSs 115A and 115B, host information service node 138B may provide MR network addresses to MSs 115F and 115G, and host information service node 138C may provide MR network addresses to MSs 115K and 115L. In some embodiments, MR network addresses for the entire fleet (e.g., for multiple availability zones) may be made available to each MS, while in other embodiments addresses of only a subset of the MRs may be provided to each MS. In one implementation, if an MS 115 does not receive a list of MR addresses from the administrative service during a time period (e.g., if the MS determines that an address list has not been received in the last 30 minutes), the MS 115 may submit a request to one or more nodes of the administrative service to obtain an up-to-date address list. The use of the administrative service to proactively provide network addresses of the monitored resources in some embodiments may eliminate the need for the MSs to waste resources trying to obtain addresses from DNS servers or similar address discovery mechanisms.

In some embodiments, the administrative service nodes 138 may be configured to provide the MR address lists at a high priority to the MSs in the event that a large-scale failure event occurs (e.g., if a substantial number of resources go offline as a result of a power outage or a network link disruption), so that the MSs can quickly re-establish persistent connections to their respective sets of monitored resources during recovery. In such embodiments, each MS 115 may determine and implement a respective schedule for connection re-establishment, and may utilize overload avoidance techniques (such as adding delays between attempts to reconnect to a given monitored resource) when implementing the schedule.

Figure 2:
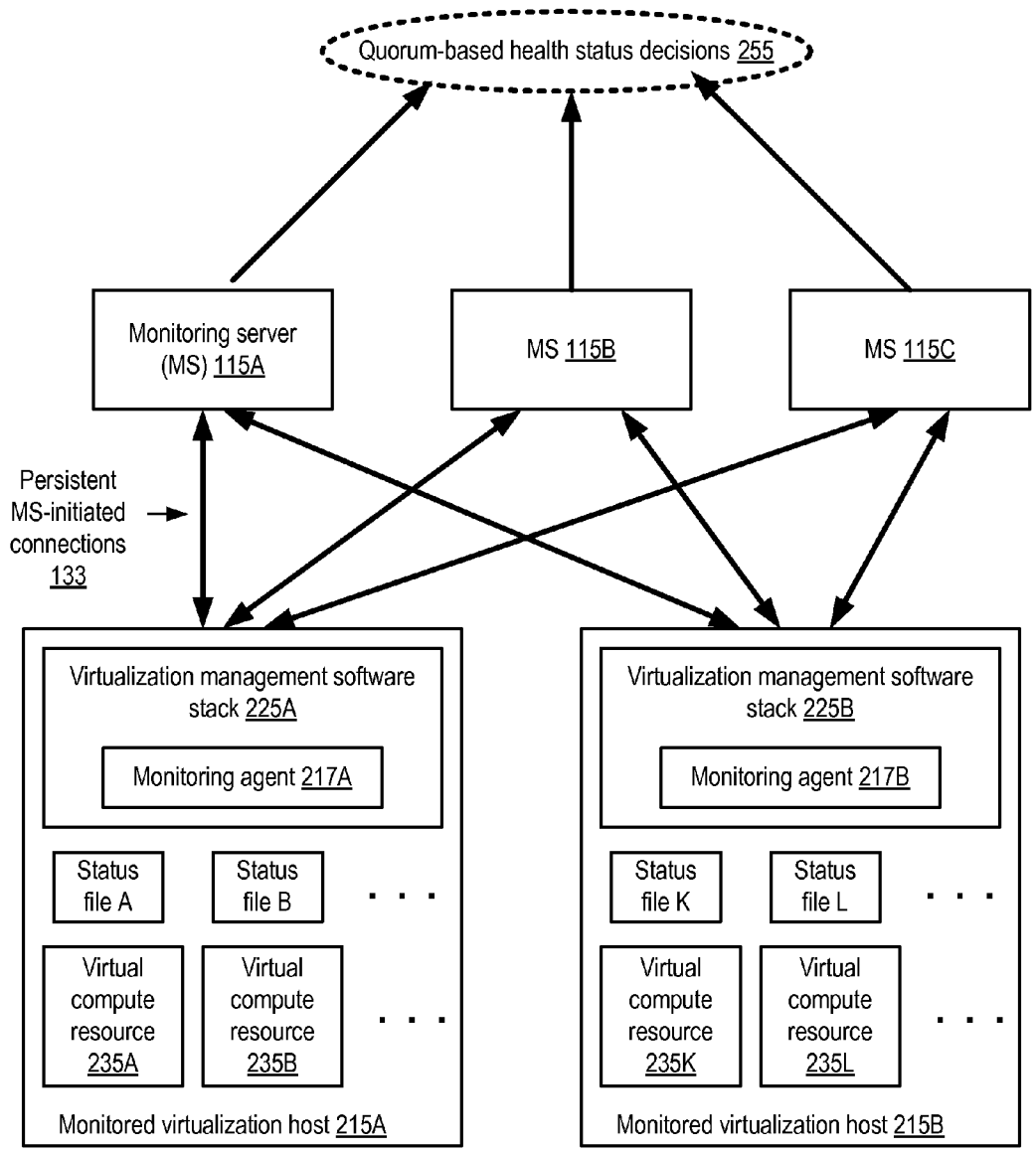
FIG. 2 illustrates an example of a system in which decisions regarding the health status of virtualization hosts and virtualized resources instantiated at the virtualization hosts are made using a quorum-based protocol, according to at least some embodiments.

In at least some embodiments, a plurality of monitoring servers may be used to monitor a given resource of the provider network. Such an approach may increase the resiliency of the monitoring service itself, in that even if a given monitoring server becomes overloaded or inaccessible, resource health monitoring can continue without interruption. FIG. 2 illustrates an example of a system in which decisions regarding the health status of virtualization hosts and virtualized resources instantiated at the virtualization hosts are made using a quorum-based protocol, according to at least some embodiments. Two monitored virtualization hosts, 215A and 215B, are shown. Each monitored virtualization host 215 includes a respective virtualization management software stack 225, and a plurality of virtual compute resources 235 (which may also be referred to as virtual machines or compute instances). For example, virtualization host 215A includes management stack 225A and virtual compute resources 235A and 235B, while virtualization host 215B includes management stack 225B and virtual compute resources 235K and 235L.

A virtualization management stack 225 may include, for example, a hypervisor providing virtualization functionality on top of the bare hardware of the host. A hypervisor may organize the resources of the virtualization host into a plurality of domains in the depicted embodiment, with one domain (which may be called domain zero) being used for administration, and the other domains being used for resource instances. An administrative instance of an operating system (e.g., as opposed to client-accessible operation systems set up on the virtual compute resources 235) may be set up in domain zero in some implementations. In the depicted embodiment, a respective monitoring agent 217 (e.g., agent 217A or 217B) may be instantiated within each virtualization management stack 225—e.g., as a daemon, process, or thread within the administrative instance of the operation system, or in the hypervisor. The monitoring agents 217 may each receive connection establishment requests from a plurality of monitoring servers 115—e.g., each of the three monitoring servers 115A, 115B and 115C may establish a respective persistent connection 133 to agent 217A, and another respective persistent connection 122 to agent 217B in the depicted embodiment.

The monitoring agent 217 may be configured to read health status information regarding the virtualization host 215 and/or the virtual compute resources 235 from a variety of sources in different embodiments. For example, in one embodiment, each virtual compute resource 235 (e.g., an operating system component at the virtual compute resource) may write some set of health status information to a respective file, such as status file A, B, K or L for virtual compute resource 235A, 235B, 235K and 235L respectively, and the agent 217 may read the contents of the file. Other sources of health state information may also be used in various embodiments, such as hypervisor or operating system log files, event monitors, performance tools, application log files, and the like. Collected health state information from a given virtualization host, including information about the virtualization host itself, as well as information about additional resources such the virtualized compute resources, may be transmitted by the local agent 217 via the connections 133 to each of the monitoring servers 115A-115C in the depicted embodiment.

In some embodiments, for any given monitored resource, a quorum-based health status decision 255 may be obtained using a subset of the plurality of MSs 115. For example, in one implementation, if there is a discrepancy between the health status of a given virtualization host 215 or compute resource 235 as detected by the different MSs, such that two of the MSs detect state S1 while the third detects state S2, the state detected by the majority of the MSs may be selected as the valid state. In one implementation, an optimistic approach to quorum-based health determination may be used, whereby even if only a single MS 115 receives information from an agent 217 indicating that a particular monitored resource R is healthy at time T, while other MSs are either inaccessible or do not have information regarding the state of R as of time T, the monitored resource R may be deemed healthy.

Data Structures for Managing Health State Information

Figure 3:
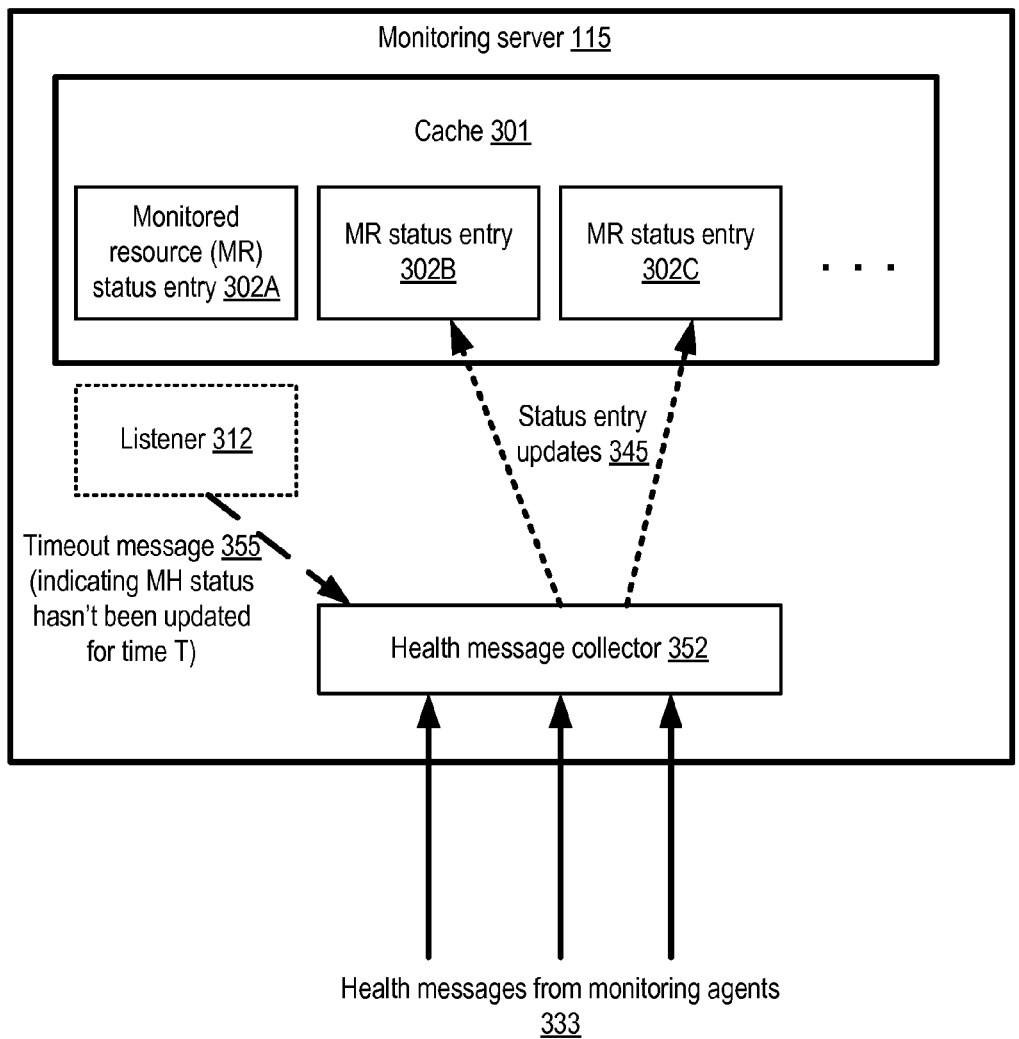
FIG. 3 illustrates an example of a cache for managing health state information at a monitoring server, according to at least some embodiments.

FIG. 3 illustrates an example of a cache 301 for managing health state information at a monitoring server 115, according to at least some embodiments. Such a cache may be instantiated in volatile memory and/or using persistent storage in various embodiments. A health message collector component 352 of the monitoring server 115 may receive health messages 333 from monitoring agents 217 at a plurality of monitored resources in the depicted embodiment. From each health message received, the corresponding health state information may be extracted and updated in a status entry 302 in the cache, such as MR status entries 302A, 302B and 302C, as indicated by arrows 345.

A notification-enabled cache mechanism may be used in some embodiments, in which, for example, a listener interface or interfaces 312 may be configured to transmit a timeout message 355 to a specified destination such as health message collector 352 if any given status entry is not updated within a configurable time window. Such a notification-enabled cache, which keeps track of how recently various entries were last modified, and proactively informs specified targets when any given entry has not been modified for a specified time, may be referred to as an "LRU (least-recently-updated least-recently-used) timeout cache". Notification mechanisms other than listener interfaces may be used in other embodiments. In some implementations, caches similar to that illustrated in FIG. 3 may be implemented using any of various classes defined in an object-oriented programming language library, such as the Java™ concurrent utilities package "java.util.concurrent".

Figure 4:
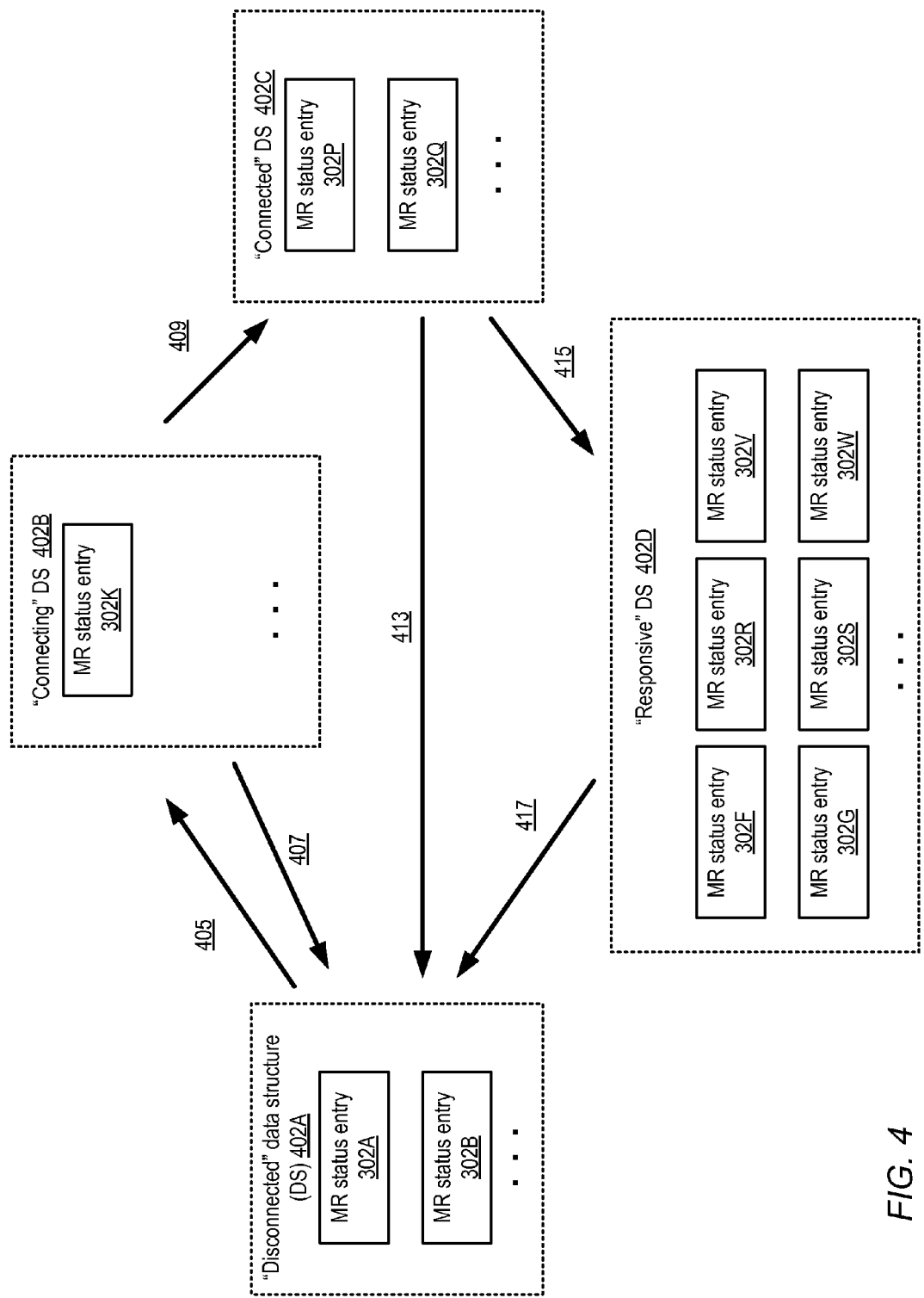
FIG. 4 illustrates examples of data structures that may be used for tracking state changes of monitored resources, according to at least some embodiments.

In some embodiments, during its lifetime, a monitored resource such as a virtualization host 215 may pass through a number of health states with respect to its connectivity with monitoring resources 115. FIG. 4 illustrates examples of data structures that may be used for tracking state changes of monitored resources, according to at least some embodiments. As shown, a given monitored resource may be in one of four states: "disconnected", "connecting", "connected" and "responsive" and a respective data structure (DS) such as a map or hash table may be maintained for each state. Entries 302 in each data structure may represent the monitored resources that are currently in the corresponding state, as determined from the perspective of the particular monitoring resource at which the data structures are established. Each of the data structures may represent a notification-enabled cache of the type illustrated in FIG. 3 in some embodiments. Thus, for monitored resources to which a persistent connection is currently not established, entries such as 302A and 302B may be created in "disconnected" data structure 402A. In some implementations, when a monitored virtualization host is being initialized or has not yet come online, an entry for the host may be created in the "disconnected" data structure 402A. When the monitoring server 115 (e.g., using health message collector 352) determines that a monitored resource is in the process of responding to a connection establishment request from the monitoring server, the entry for that monitored resource may be logically transferred from the "disconnected" data structure 402A and to "connecting" data structure 402B, as indicated by arrow 405. Thus, in the depicted example, MR entry 302K represents a monitored resource that is currently in the process of connecting to the monitoring resource. In some cases, an MR may become disconnected before a connection is successfully established, in which case its entry may be moved back from "connecting" data structure 402B to "disconnected" data structure 402, as indicated by arrow 407.

From a "connecting" state, monitored resources may typically move fairly quickly to "connected" state (indicating that the persistent connection is successfully established) (as indicated by arrow 409), and thence to "responsive" state (indicating that one or more health state messages have been received successfully at the monitoring server), as indicated by arrow 415. Each state transition of a given resource may be reflected by the logical transfer of a corresponding entry 302 for the resource from one data structure to another. In the example shown, entries 302P or 302Q may be moved from "connected" data structure 402C to "responsive" data structure 402D as soon as the monitoring server determines that a threshold number of health messages have been received from the corresponding resource, for example. At any given time during normal operation, the majority of entries 302 may be expected in the "responsive" data structure 402D, with only a few entries typically in the other states. In the depicted embodiment, transitions may occur from any of the other states to the "disconnected" state, as indicated by arrows 407, 413, and 417. Other states than those shown in FIG. 4 may be defined for monitored resources in some embodiments. In at least one embodiment, different categories of monitored resources may have respective sets of state transitions defined—e.g., virtualization hosts may be in any of one set of states, while virtual compute resources may be in any of a different set of states.

Methods for Network Fleet Monitoring

Figure 5:
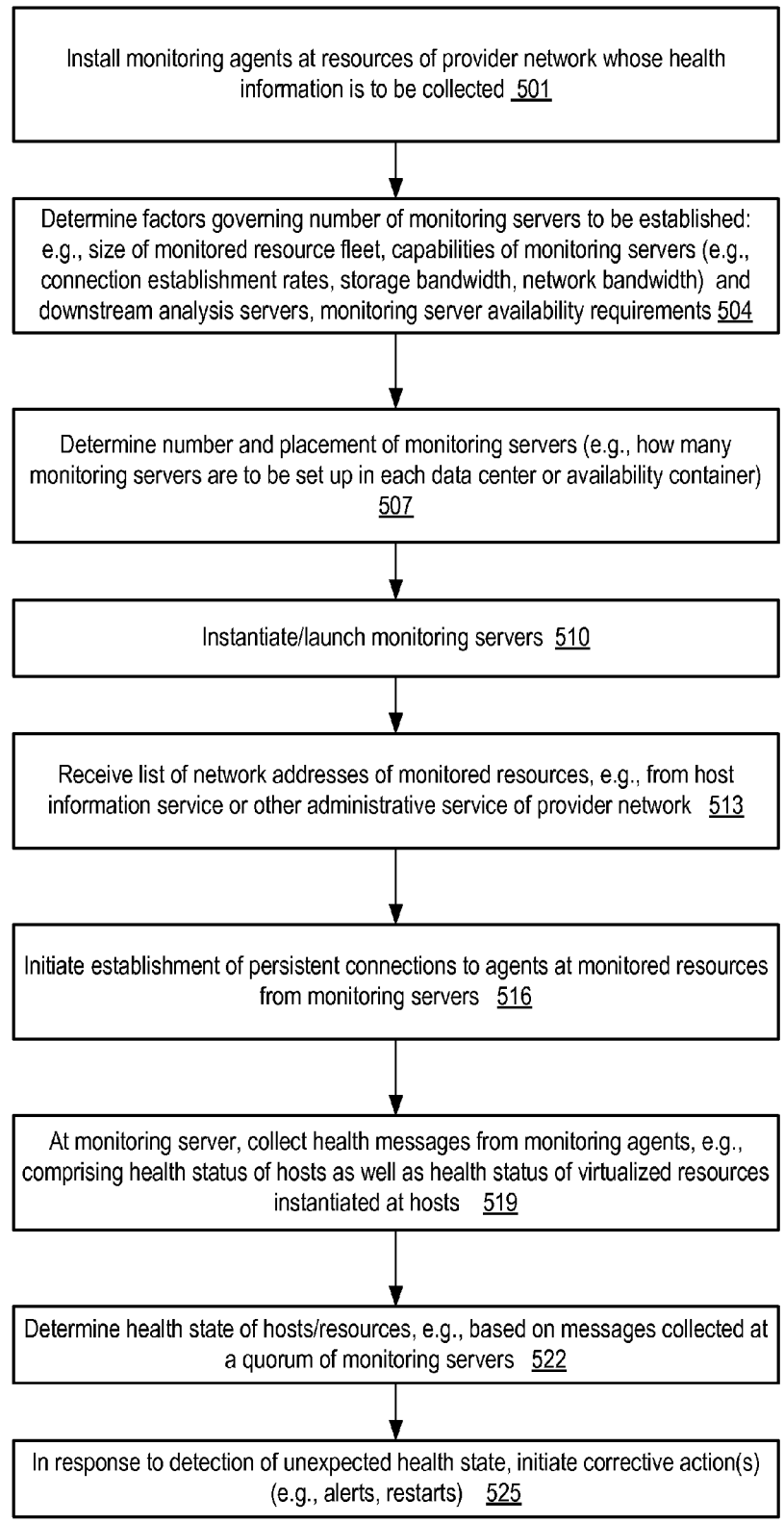
FIG. 5 is a flow diagram illustrating aspects of operations that may be performed to implement a resource health monitoring system at a provider network, according to at least some embodiments.

FIG. 5 is a flow diagram illustrating aspects of operations that may be performed to implement a resource health monitoring system at a provider network, according to at least some embodiments. As shown in element 501, monitoring agents may be installed at various network-accessible resources of a provider network whose health state is to be monitored. For example, in one embodiment such agents may comprise software modules that are included in a standard installation image of an operating system or hypervisor that is installed on each virtualization host. In some embodiments, a respective monitoring agent may be established for each resource of interest (e.g., an agent may be installed for each of several virtual compute servers at a given virtualization host), while in other embodiments, a given agent may be configurable to monitor several different resources.

The size and distribution of the monitoring server fleet, e.g., how many monitoring servers are to be set up, and where the monitoring servers are to be located with respect to the monitored resources, may be determined based on a variety of factors in different embodiments. For example, in one embodiment, a number of different performance-related capabilities of the servers to be used as monitoring servers may be taken into consideration. As shown in element 504, connection establishment rate capabilities (e.g., how quickly network connections can be established from the monitoring servers to the agents, which may be a function of the computing power and/or networking components at the server), storage bandwidth (e.g., how many health state snapshots can be written to storage server nodes per unit time from the monitoring servers), network bandwidth, and the like may be considered. The total size of the monitored resource fleet may influence the size of the monitoring fleet. In some embodiments, the monitored resource fleet may be partitioned or sharded into subsets (e.g., with an approximately equal number of monitored resources in each partition), and a monitoring resource group with N monitoring servers may be set up for each partition. The computing capabilities of the downstream aggregated analysis servers 142 and/or availability/redundancy requirements for the monitoring servers themselves may also impact the size of the monitoring sever fleet in various embodiments. The number and placement of the monitoring servers may then be determined (element 507)—e.g., how many monitoring servers are to be established in each data center or availability container, and specifically where (e.g., in which network subnet) the monitoring servers should be set up.

The appropriate number of monitoring servers may then be instantiated or launched (element 510). A list of network addresses of the monitored resources for which a given monitoring server is responsible may then be received at the monitoring server, e.g., from an administrative service such as a host information service of the provider network (element 513). The monitoring server may then initiate establishment of persistent or long-lived connections to the monitoring agents at some or all of the monitored resources (element 516). Using the persistent connections set up from the monitoring servers, health messages may be collected from the monitoring agents (element 519), comprising, for example, status information for virtualization hosts as well as other resources instantiated on the virtualization hosts. Health message contents may include a comprehensive list of health indicators in some implementations, while in other implementations, a differential approach may be used in which only those health indicators that have changed since the previous message was generated are included. In at least some embodiments, decisions regarding the health state of a monitored resource (e.g., a virtualization host, a resource instantiated at a virtualized host, or an application running in a virtualized host) may be made using a quorum-based protocol (element 522). For example, if N monitoring servers are configured to receive health messages regarding a given resource, some quorum number less than N of the monitoring servers may be sufficient to determine the health state of the given resource. If an unexpected health state is identified (e.g., either at one monitoring server, by a plurality of monitoring servers involved in a quorum protocol, or at a downstream analysis server), corrective actions may be initiated (element 525), such as restarts, alert generation, and the like. In some embodiments, health status information received from the agents may be passed on to analysis servers via a storage service of the provider network—e.g., a storage service node may be used as the destination of health state information snapshots collected/generated at the monitoring server, and as a source from which the analysis servers obtain input for their analysis. Such snapshots may also be either comprehensive (e.g., each snapshot includes the complete set of state indicators available) or differential (e.g., at least some snapshots only include changes since the previous snapshot) in different implementations. In some embodiments, instead of collecting health messages at the monitoring servers for a time period and then generating snapshots, the health information may be streamed in real time to the storage service nodes.

Figure 6:
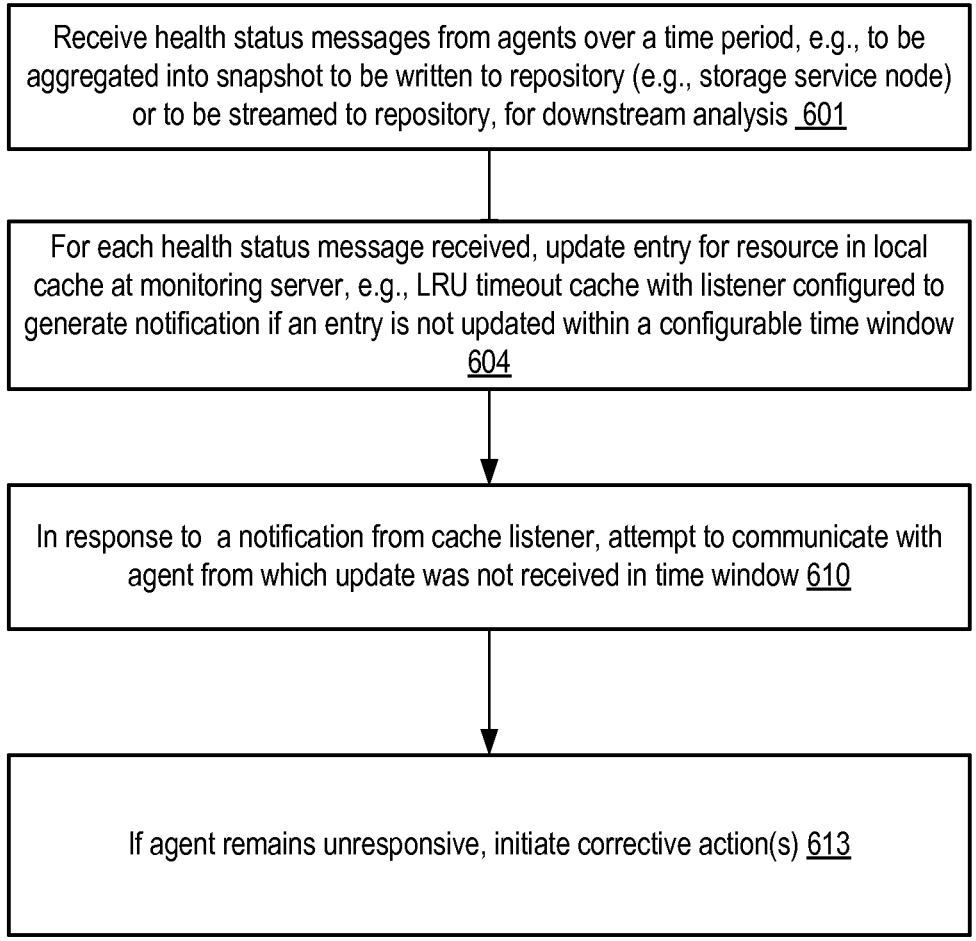
FIG. 6 is a flow diagram illustrating aspects of operations that may be performed at a monitoring server that utilizes a notification-enabled cache to identify potential unexpected health states, according to at least some embodiments.

FIG. 6 is a flow diagram illustrating aspects of operations that may be performed at a monitoring server that utilizes a notification-enabled cache to identify potential unexpected health states, according to at least some embodiments. As shown in element 601, a component of a monitoring server (such as health message collector 352 of FIG. 3) may be configured to receive health messages from a plurality of monitoring agents instantiated at various resources. Health status information received during a given time period may be consolidated and stored in the form of a snapshot written to a repository, e.g., at a storage service node, for downstream analysis. In some implementations, the health status information may instead be streamed directly to the repository. In some embodiments, a complete set of the health state metrics associated with a given resource may be written to the repository, while in other embodiments a differential approach may be used, in which at least in some cases only changes since the last snapshot are written to the repository. It is noted that the decision regarding the comprehensive versus differential approach to health message generation at the monitoring agents (described earlier) may be independent of the decision regarding comprehensive versus differential approach with respect to saving health status information to the repository. Thus, in at least some embodiments, four combinations may be possible: (a) health messages may be comprehensive and comprehensive snapshots may be stored in the repository, (b) health messages may be differential and comprehensive snapshots may be stored in the repository, (c) health messages may be comprehensive and differential snapshots may be stored in the repository, or (d) health messages may be differential and differential snapshots may be stored in the repository.

In addition to aggregating and storing the data in the repository, a local cache may be maintained of the health information extracted from the messages in the depicted embodiment. For example, a respective entry may be maintained in a notification-enabled cache for each monitored resource (element 604), and the entry may be updated whenever a health message regarding the monitored resource is received. An LRU timeout cache may be used in some implementations, with a listener configured to generate a notification if any given entry is not updated within a configurable time window. If a notification is received (e.g., at the message collector) indicating that a health message from a given agent has not been received during a time interval, in the depicted embodiment an attempt may be made to contact the agent (element 607). If the agent sends an updated health message, the cache entry may be updated accordingly. If the agent remains unresponsive (element 610), the resource(s) associated with the agent may be deemed to be in an unexpected or unhealthy state, and corrective actions such as raising an alarm or restarting the resources may be taken.

Figure 7:
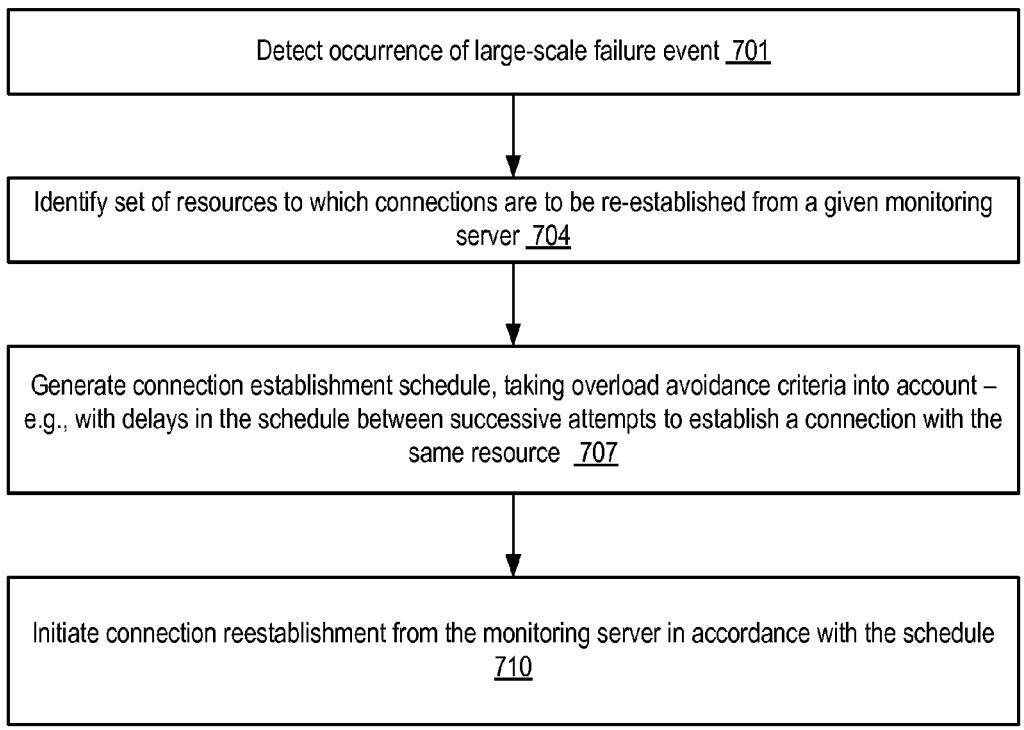
FIG. 7 is a flow diagram illustrating aspects of operations that may be performed in response to a determination that a large-scale outage has occurred in a provider network, according to at least some embodiments.

FIG. 7 is a flow diagram illustrating aspects of operations that may be performed in response to a determination that a large-scale outage has occurred in a provider network, according to at least some embodiments. An infrastructure outage (e.g., a power failure, or a network rupture) that affects large numbers (e.g., hundreds or thousands) of resources may result in widespread disruptions of client applications, and such failures may lead to substantial damage to the reputation of the provider network's operator if the recovery operations are mishandled or take too long. Accordingly, a systematic approach to re-establishing network contact with, and control over, the affected resources may be employed, in which each monitoring server uses a predetermined schedule with built-in overload protection, as illustrated in FIG. 7.

As shown in element 701 of FIG. 7, an occurrence of a large-scale failure event may be detected, e.g., by a loss of connectivity to a threshold number of monitored resources from one or more monitoring servers 115. The set of resources to which connectivity is to be re-established from a given monitoring server may be determined, e.g., by examining the contents of a "disconnected" data structure similar to 402A (element 704). A schedule for re-establishing the connections may be determined (element 707), according to which the resources are contacted in a predetermined order. Appropriate back-off delays may be included in the schedule for various eventualities to avoid thrashing or overload. For example, delays may be introduced between connection establishment retries (in case a given monitored resource does not respond in a timely fashion to a connection establishment request), or between other recovery-related operations such as restart commands being issued if a monitored resource remains in a connecting or connected state for a duration longer than a threshold. The connections from the monitoring servers to the monitored resources may be re-established in accordance with the schedule (element 710). The sequence of operations specified in the schedules of different monitoring servers may be selected and coordinated in some embodiments in such a way that the work associated with recovery from the large-scale failure is balanced across the affected portions of the provider network—e.g., that not all the monitoring servers attempt to utilize the same network paths or links simultaneously or near-simultaneously.

Figure 8:
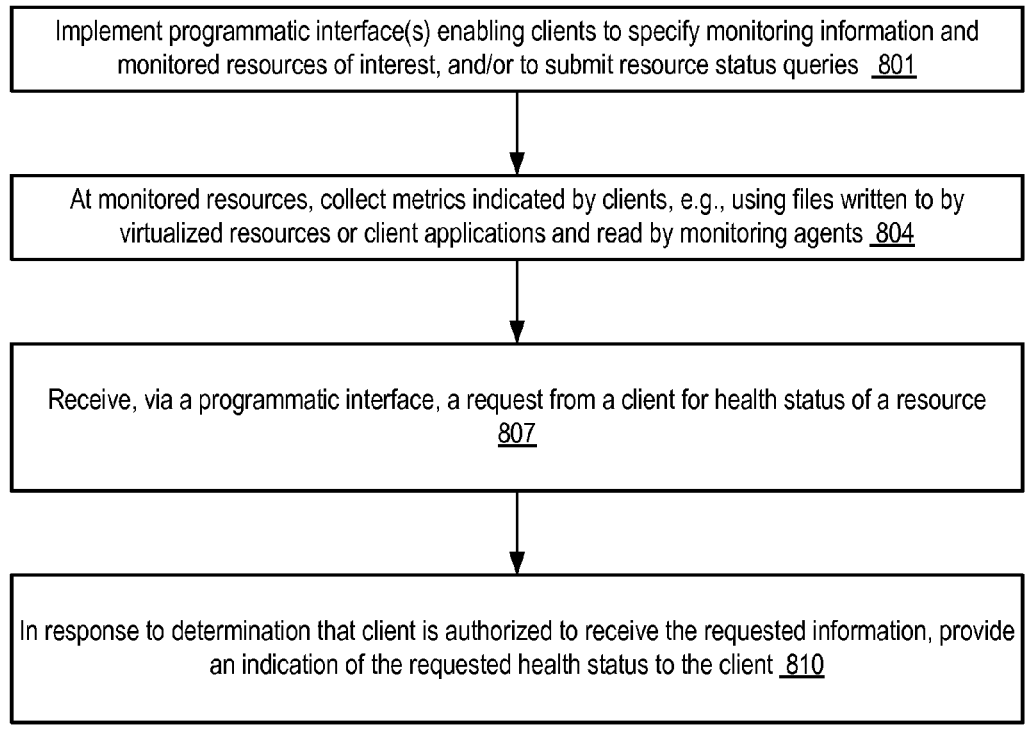
FIG. 8 is a flow diagram illustrating aspects of operations that may be performed to enable clients of a provider network's services to view resource health state information, according to at least some embodiments.

In some embodiments, at least a portion of the health state information collected from the monitored resources may be provided to clients of the services being implemented in the provider network. For example, clients to whom virtual compute resources have been allocated may be enabled to query the state of the allocated resources via a programmatic interface. In some embodiments, in addition to (or instead of) the health states of the virtual resources and hosts, the health states of various types of client applications may be monitored using the kinds of techniques described above, e.g., using persistent connections whose establishment is initiated by the monitoring servers 115. FIG. 8 is a flow diagram illustrating aspects of operations that may be performed to enable clients of a provider network's services to view resource health state information, according to at least some embodiments. As shown in element 801, one or more programmatic interfaces, such as web pages or web sites, application programming interfaces (APIs), command-line tools, or graphical user interfaces, may be implemented to enable clients to submit resource status queries and/or to specify the resources of interest, and the kinds of status information of interest. In some embodiments, at least a subset of the status information collected by the monitoring servers may not be exposed to clients—e.g., while state information about virtualized resources allocated to the clients may be provided to the clients, state information about physical hosts or servers at which the virtualized resources are instantiated may not be available to clients.

As shown in element 804, the metrics of interest may be collected from monitored resources of interest to the client, e.g., using files that are written to by the resources or applications and read by the monitoring agents in a manner similar to that illustrated in FIG. 2. When a client request for health status of a specified resource is received (element 807), the request may be validated (e.g., to ensure that the client is authorized to view the requested information). If the client has the appropriate permissions, an indication of the requested information may be provided (element 810).

It is noted that in various embodiments, operations other than those illustrated in the flow diagrams of FIGS. 5, 6, 7 and 8 may be implemented to support network fleet monitoring, and that some of the operations shown may not be implemented, or may be implemented in a different order or in parallel rather than sequentially.

Use Cases

The techniques described above, of monitoring resource states using long-lasting server-initiated connections and lightweight monitoring agents may be useful in a variety of different scenarios. For example, for large provider networks with tens of thousands of monitored virtualization hosts, alternative approaches in which the monitored entities are required to try to initiate connection establishment with monitoring servers may sometimes result in thrashing or overload situations, especially after large-scale failures, while the systematic schedule-driven approaches to connection establishment described above may avoid such problematic scenarios. In addition, using low-overhead monitoring agents at virtualization hosts may increase the fraction of the hosts' computing capabilities that can be allocated for client use. The ability to use service-provided network addresses for the monitored resources, instead of relying on dynamically querying for network addresses, may also reduce the variability of the time taken to respond to certain types of outages.

Illustrative Computer System

Figure 9:
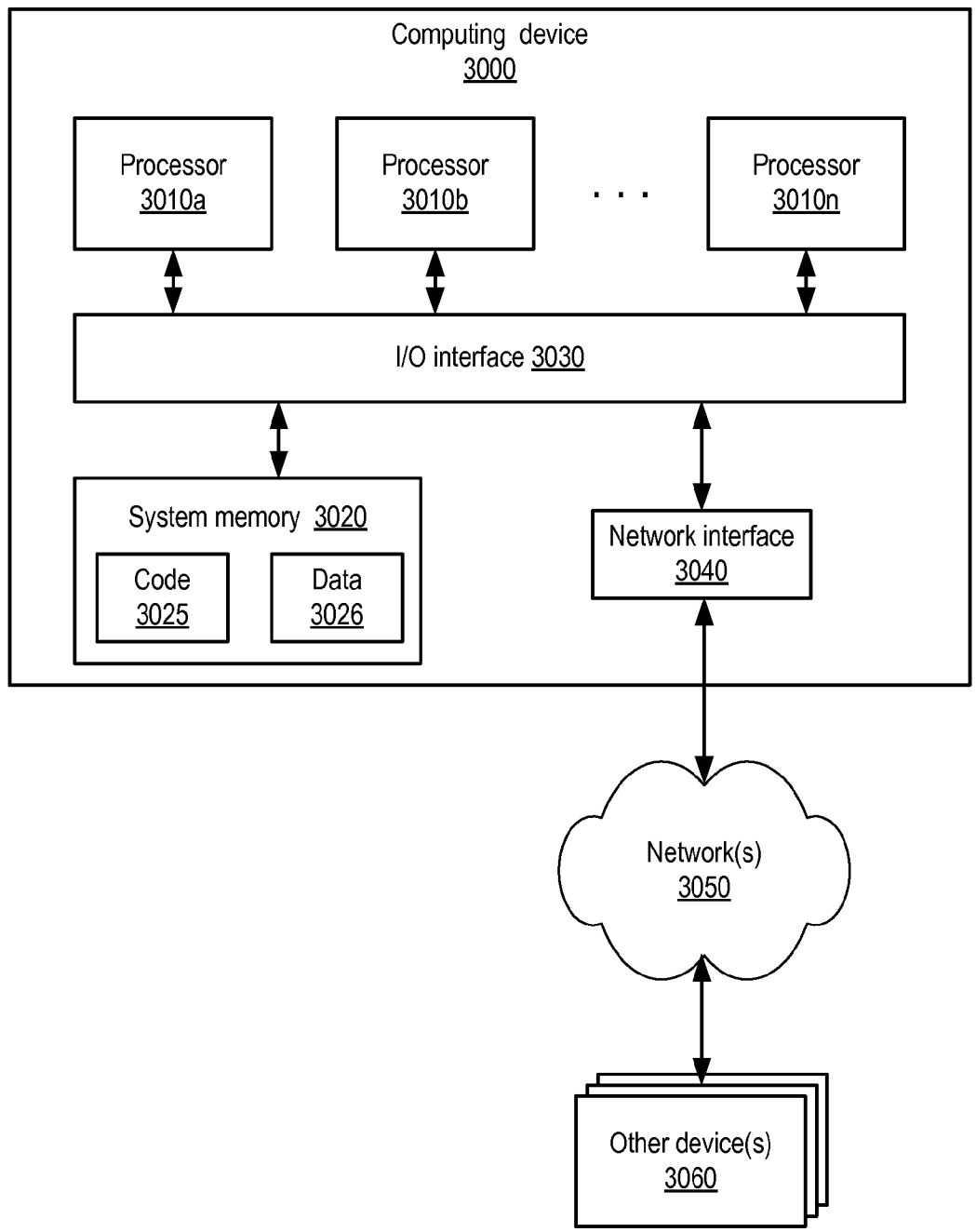
FIG. 9 is a block diagram illustrating an example computing device that may be used in at least some embodiments.

In at least some embodiments, a server that implements a portion or all of one or more of the technologies described herein, including the techniques to implement monitoring resources, monitored resources, storage service nodes, aggregated status analyzers, and host information service nodes, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices including a particular monitoring server, wherein the one or more computing devices comprise one or more hardware processors configured to:
receive, at the particular monitoring server of one or more monitoring servers configured to collect health state information of a plurality of network-accessible resources of a provider network, a list of network addresses of a set of monitored hosts of the provider network, wherein said list is generated by an administrative service of the provider network;
initiate, from the particular monitoring server, an establishment of a persistent network connection to a monitoring agent installed at a monitored host of the set of monitored hosts;
obtain, at the particular monitoring server via the persistent network connection during a time interval, a plurality of health messages from the monitoring agent, wherein the plurality of health messages comprises (a) a host status message associated with the monitored host and (b) a resource status message associated with at least one resource configured at the monitored host;
store, at a storage service of the provider network, a representation of the plurality of health messages, wherein the representation comprises (a) a host status entry associated with the host status message and (b) a resource status entry associated with the resource status message;
in response to a determination, based at least in part on an analysis of the plurality of health messages, that an unexpected state was encountered at the monitored host, initiate a corrective action corresponding to the unexpected state.

2. The system as recited in claim 1, wherein the one or more hardware processors are configured to:
determine a number of monitoring servers to be instantiated based at least in part on one or more of: (a) a connection establishment rate capability associated with the particular monitoring server (b) a health message analysis rate capability associated with a resource configured to perform the analysis of the plurality of health messages (c) a storage bandwidth capability associated with storing the representation of the plurality of health messages at the storage service of the provider network, (d) an availability requirement associated with the number of monitoring servers, or (e) the number of network-accessible resources for which health information is to be collected.

3. The system as recited in claim 1, wherein the provider network comprises a plurality of data centers including a first data center and a second data center, wherein the monitored host is located in the first data center, and wherein the particular monitoring server is located in the second data center.

4. The system as recited in claim 1, wherein the one or more hardware processors are configured to:
instantiate a cache at the particular monitoring server, comprising respective cache entries indicative of health messages received from a plurality of monitoring agents at a plurality of monitored hosts;

receive a notification generated by a listener associated with the cache, indicating that a health message of a particular type has not been received from a different monitoring agent at a different monitored host within a configurable time interval; and determine, based at least on the notification, that the different monitored host is in an unexpected health state.

5. The system as recited in claim 1, wherein the one or more hardware processors are configured to:

determine, in accordance with an overload avoidance criterion, a connection establishment schedule to be used to re-establish respective persistent connections from the particular monitoring server to a plurality of monitored hosts of the provider network in response to a detection of a failure event, wherein the overload avoidance criterion includes a delay to be introduced between successive connection attempts; and re-establish persistent connections to the monitored host in accordance with the schedule.

6. A method, comprising:

performing, by one or more computing devices:

receiving, at a particular monitoring server of a plurality of monitoring servers designated to collect health state information of network-accessible resources of a provider network including a set of monitored hosts, a list of network addresses of the set of monitored hosts;

initiating, from the particular monitoring server, an establishment of a persistent network connection to a monitoring agent installed at a monitored host of the set of monitored hosts;

obtaining, at the particular monitoring server via the persistent network connection during a time interval, a plurality of health messages from the monitoring agent, wherein the plurality of health messages comprises (a) a host status message associated with the monitored host and (b) a resource status message associated with at least one resource configured at the monitored host;

storing, at a storage service of the provider network, a representation of the plurality of health messages, wherein the representation comprises (a) a host status entry associated with the host status message and (b) a resource status entry associated with the resource status message; and in response to determining, based at least in part on an analysis of the plurality of health messages, that an unexpected state was encountered at the monitored host, initiating a corrective action corresponding to the unexpected state.

7. The method as recited in claim 6, further comprising performing, by the one or more computing devices:

determining the number of monitoring servers to be designated to collect the health state information of the network-accessible resources, based at least in part on one or more of: (a) a connection establishment rate capability associated with the particular monitoring server (b) a health message analysis rate capability associated with a resource configured to perform the analysis of the plurality of health messages (c) a storage bandwidth capability associated with storing a representation of the plurality of health messages at a storage service of the provider network, (d) an availability requirement associated with the plurality of monitoring servers, or (e) the number of network-accessible resources to be monitored by the plurality of monitoring servers.

8. The method as recited in claim 6, wherein the provider network comprises a plurality of data centers including a first data center and a second data center, wherein the monitored host is located in the first data center, and wherein the particular monitoring server is located in the second data center.

9. The method as recited in claim 6, further comprising performing, by the one or more computing devices:

determining whether the monitored host is in a healthy state based at least in part on an analysis of health messages collected by a quorum of the plurality of monitoring servers, wherein a size of the quorum is less than the number of monitoring servers.

10. The method as recited in claim 6, further comprising performing, by the one or more computing devices:

instantiating a cache at the particular monitoring server, comprising respective cache entries indicative of health messages received from a plurality of monitoring agents at a plurality of monitored hosts;

receiving a notification generated by a listener associated with the cache, indicating that a health message of a particular type has not been received from a different monitoring agent at a different monitored host within a configurable time interval; and determining, based at least on the notification, that the different monitored host is in an unexpected health state.

11. The method as recited in claim 6, further comprising performing, by the one or more computing devices:

determining, in accordance with an overload avoidance criterion, a connection establishment schedule to be used to re-establish respective persistent connections from the particular monitoring server to a plurality of monitored hosts of the provider network in response to a detection of a failure event, wherein the overload avoidance criterion includes a delay to be introduced between successive connection attempts; and re-establishing persistent connections to the monitored host in accordance with the schedule.

12. The method as recited in claim 6, wherein the resource configured at the monitored host comprises a virtualized compute resource.

13. The method as recited in claim 6, wherein monitoring agent is installed on a component of a virtualization management software stack at the monitored host, further comprising performing, by the one or more computing devices:

reading, by the monitoring agent, from a designated location on the monitored host, a file indicative of a health state of the resource; and transmitting at least a portion of contents of the file via the persistent network connection to the particular monitoring server.

14. The method as recited in claim 6, further comprising performing, by the one or more computing devices:

determining an amount of time elapsed since the list of network addresses was received; and in response to determining that the amount of time exceeds a threshold, transmitting a request to an administrative component of the provider network to provide an updated list of network addresses.

15. The method as recited in claim 6, further comprising performing, by the one or more computing devices:

implementing a programmatic interface enabling a client of a provider network service to obtain health status information of the monitored host; and in response to receiving a request via the programmatic interface, providing an indication of the health status of the monitored host.

16. The method as recited in claim 6, wherein the plurality of health messages obtained during the time interval includes a particular health message followed by a differential health message, wherein the particular health message includes a first number of health indicators and the differential health message includes a different number of health indicators, and wherein the differential health message represents changes detected by the monitoring agent after the particular health message was generated.

17. A non-transitory computer-accessible storage medium storing program instructions that when executed on one or more processors:

receive, at a particular monitoring server of a plurality of monitoring servers designated to collect health state information of network-accessible resources of a provider network including a set of monitored hosts, a list of network addresses of the set of monitored hosts;

initiate, from the particular monitoring server, an establishment of a persistent network connection to a monitoring agent installed at a monitored host of the set of monitored hosts;

obtain, at the particular monitoring server via the persistent network connection during a time interval, a plurality of health messages from the monitoring agent, wherein the plurality of health messages comprises (a) a host status message associated with the monitored host and (b) a resource status message associated with at least one resource configured at the monitored host;

store, at a storage service of the provider network, a representation of the plurality of health messages, wherein the representation comprises (a) a host status entry associated with the host status message and (b) a resource status entry associated with the resource status message; and save a representation of the plurality of health messages within a repository accessible by a resource configured to analyze the plurality of health messages.

18. The non-transitory computer-accessible storage medium as recited in claim 17, wherein the provider network comprises a plurality of data centers including a first data center and a second data center, wherein the monitored host is located in the first data center, and wherein the particular monitoring server is located in the second data center.

19. The non-transitory computer-accessible storage medium as recited in claim 17, wherein the instructions when executed on the one or more processors:

instantiate a cache at the particular monitoring server, comprising respective cache entries indicative of health messages received from a plurality of monitoring agents at a plurality of monitored hosts;

receive a notification generated by a listener associated with the cache, indicating that a health message of a particular type has not been received from a different monitoring agent at a different monitored host within a configurable time interval; and determine, based at least on the notification, that the different monitored host is in an unexpected health state.

20. The non-transitory computer-accessible storage medium as recited in claim 17, wherein the instructions when executed on the one or more processors:

determine, in accordance with an overload avoidance criterion, a connection establishment schedule to be used to re-establish respective persistent connections from the particular monitoring server to a plurality of monitored hosts of the provider network in response to a detection of a failure event, wherein the overload avoidance criterion includes a delay to be introduced between successive connection attempts; and re-establishing persistent connections to the monitored host in accordance with the schedule.

21. The non-transitory computer-accessible storage medium as recited in claim 17, wherein the instructions when executed on the one or more processors:

in response to a determination that the host status message indicates that the monitored host has undergone a state transition since a previous host status message from the monitored host was received, remove a host status record associated with the monitored host from a first data structure; and insert a host status record associated with the monitored host into a different data structure.

22. The non-transitory computer-accessible storage medium as recited in claim 17, wherein the plurality of health messages obtained during the time interval include a particular health message followed by a differential health message, wherein the particular health message includes a first number of health indicators and the differential health message includes a smaller number of health indicators, and wherein the differential health message represents changes detected by the monitoring agent after the particular health message was generated.

23. The non-transitory computer-accessible storage medium as recited in claim 17, wherein the instructions when executed on the one or more processors:

obtain, at the particular monitoring server via the persistent network connection during a subsequent time interval, a second plurality of health messages from the monitoring agent; and save a differential representation of the second plurality of health messages within the repository, wherein the differential representation comprises an indication of health state changes detected during the subsequent time interval.

* * * * *